United States Patent
Schaupmann et al.

(10) Patent No.: US 10,287,029 B2
(45) Date of Patent: May 14, 2019

(54) METHOD AND SYSTEM FOR DETECTING DAMAGE TO COMPONENTS OF AN AIRCRAFT

(71) Applicant: Airbus Operations GmbH, Hamburg (DE)

(72) Inventors: Christian Schaupmann, Hamburg (DE); Jens Kosubek, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 74 days.

(21) Appl. No.: 15/453,528

(22) Filed: Mar. 8, 2017

(65) Prior Publication Data

US 2017/0259936 A1     Sep. 14, 2017

(30) Foreign Application Priority Data

Mar. 11, 2016 (DE) .................. 10 2016 204 038

(51) Int. Cl.
   *B64D 45/00* (2006.01)
   *G01M 5/00* (2006.01)
   *G07C 5/08* (2006.01)

(52) U.S. Cl.
   CPC ............ *B64D 45/00* (2013.01); *G01M 5/00* (2013.01); *G07C 5/0808* (2013.01); *B64D 2045/0085* (2013.01)

(58) Field of Classification Search
   CPC ........ B64D 45/00; G01M 5/00; G07C 5/0808
   See application file for complete search history.

(56) References Cited

U.S. PATENT DOCUMENTS

| | | |
|---|---|---|
| 3,026,516 A | 3/1962 | Davis |
| 2002/0193063 A1 | 12/2002 | Scheerer et al. |
| 2010/0203819 A1 | 8/2010 | Horner |
| 2011/0183595 A1 | 7/2011 | Liebich |

FOREIGN PATENT DOCUMENTS

DE    102010005902    7/2011

OTHER PUBLICATIONS

German Search Report, dated Nov. 30, 2016, priority document.

*Primary Examiner* — Basil T. Jos
(74) *Attorney, Agent, or Firm* — Greer, Burns & Crain, Ltd.

(57) ABSTRACT

In a method for detecting damage to a component of an aircraft, having an unpressurized first area and a pressurized second area, at least one theoretical pressure parameter, characteristic of a theoretical pressure in the unpressurized first area, a theoretical pressure in the pressurized second area or a theoretical pressure difference between the unpressurized first area and the pressurized second area, is determined. At least one actual pressure parameter, characteristic of an actual pressure in the unpressurized first area, an actual pressure in the pressurized second area or an actual pressure difference between the unpressurized first area and the pressurized second area, is recorded. The theoretical pressure parameter is compared with the actual pressure parameter. Damage to a component of the aircraft causing a compression of the unpressurized first area is detected when a difference between the theoretical pressure parameter and the actual pressure parameter exceeds a threshold value.

15 Claims, 3 Drawing Sheets

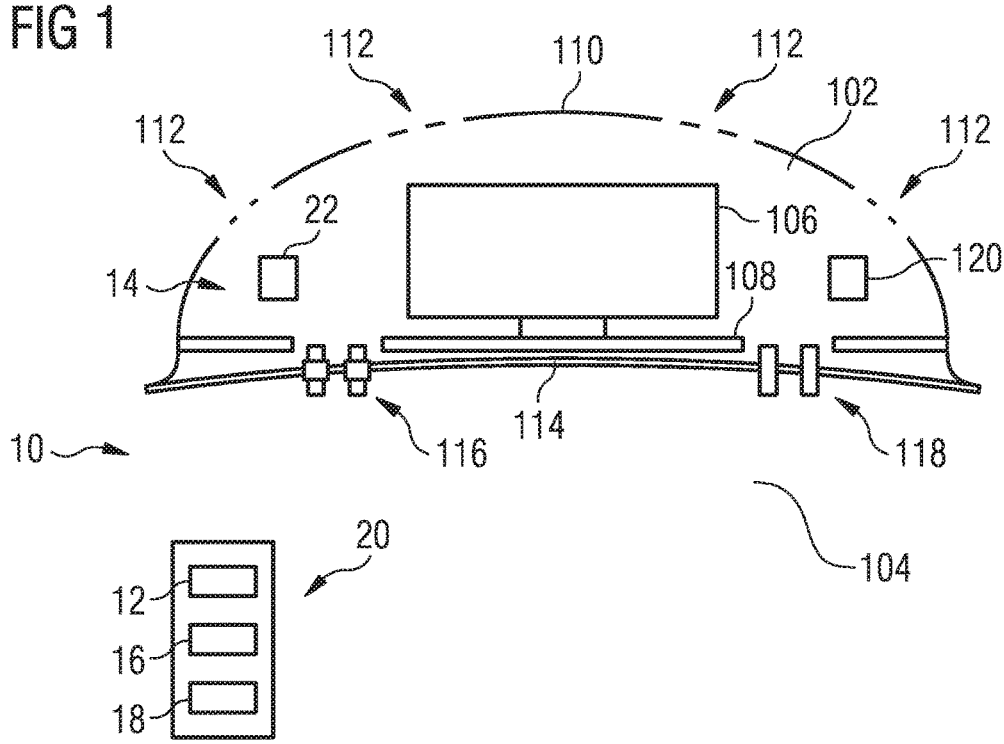
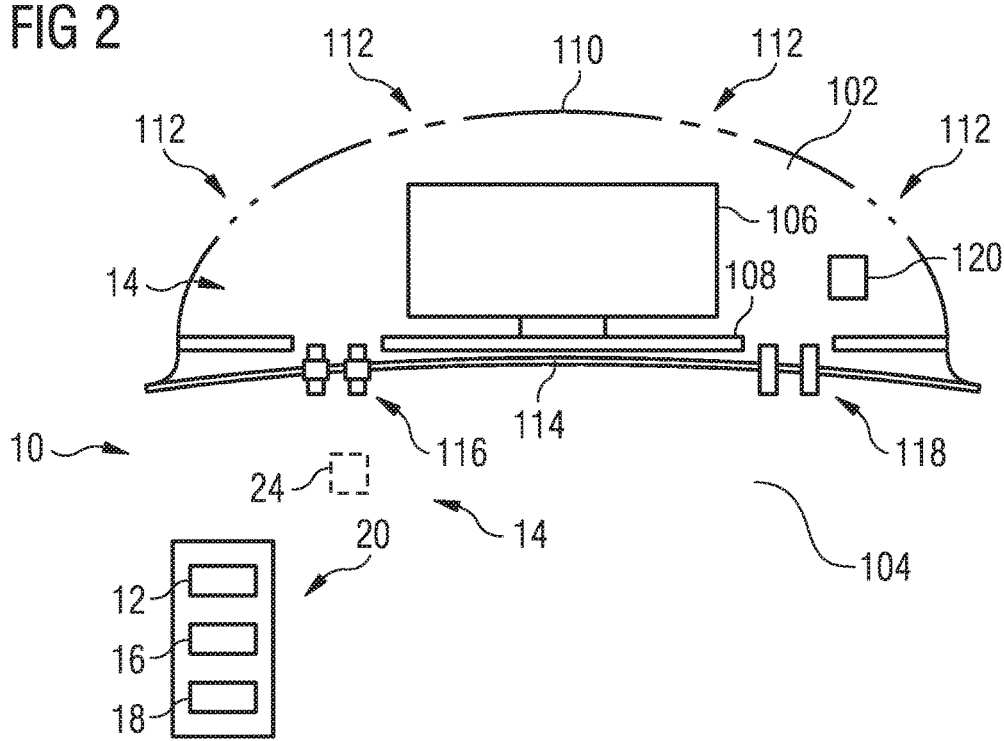

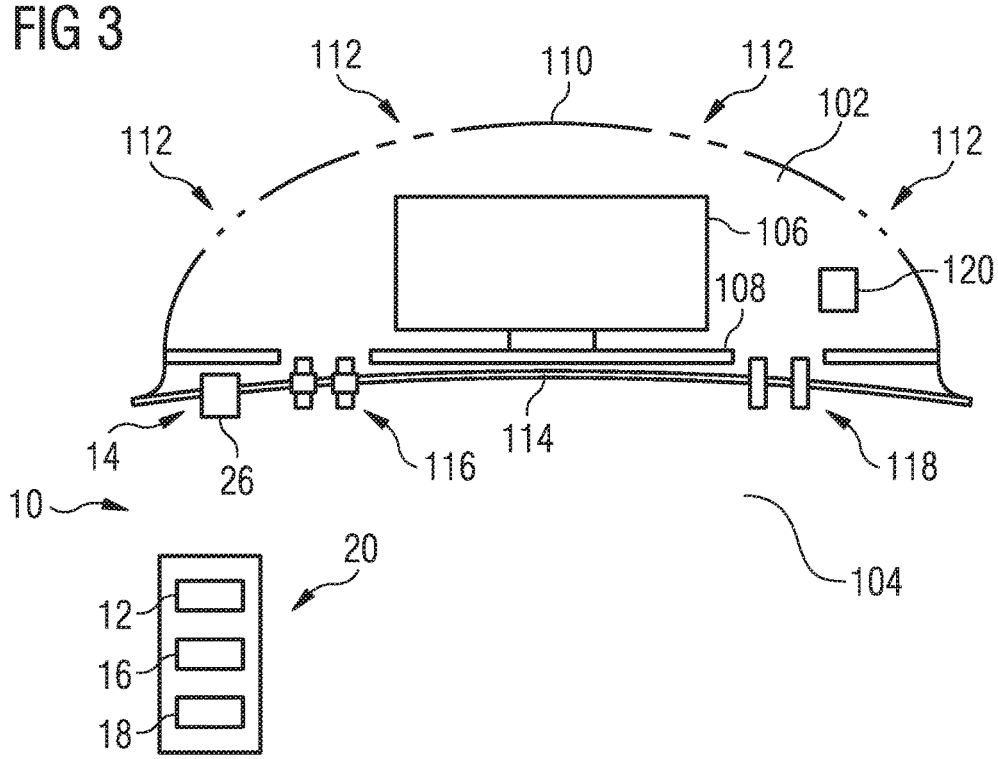
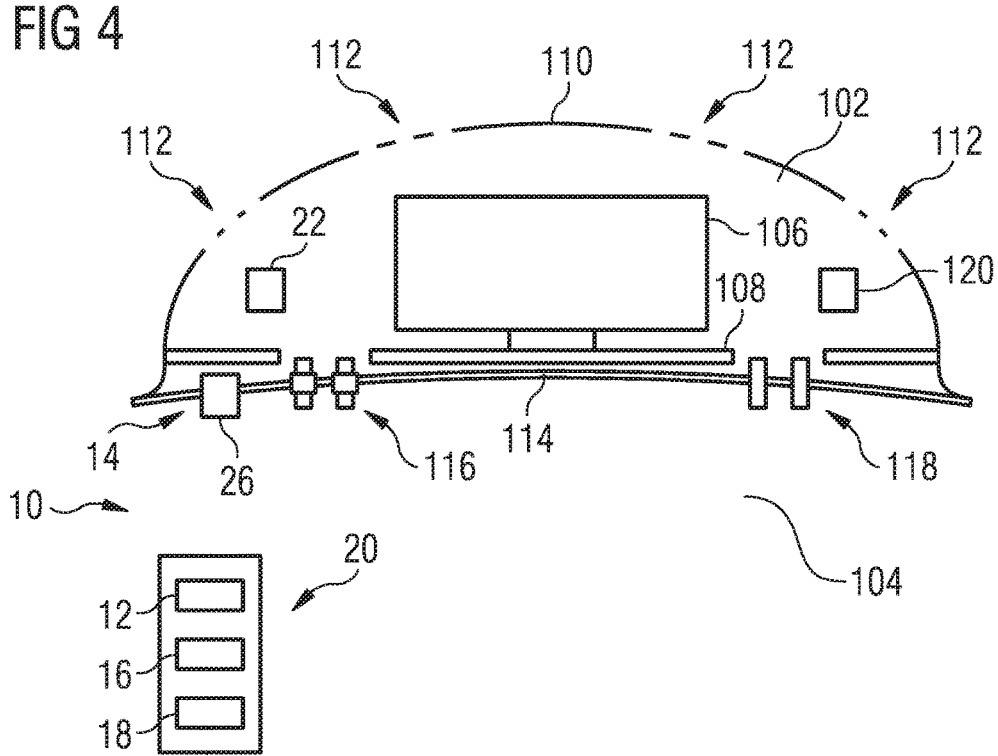

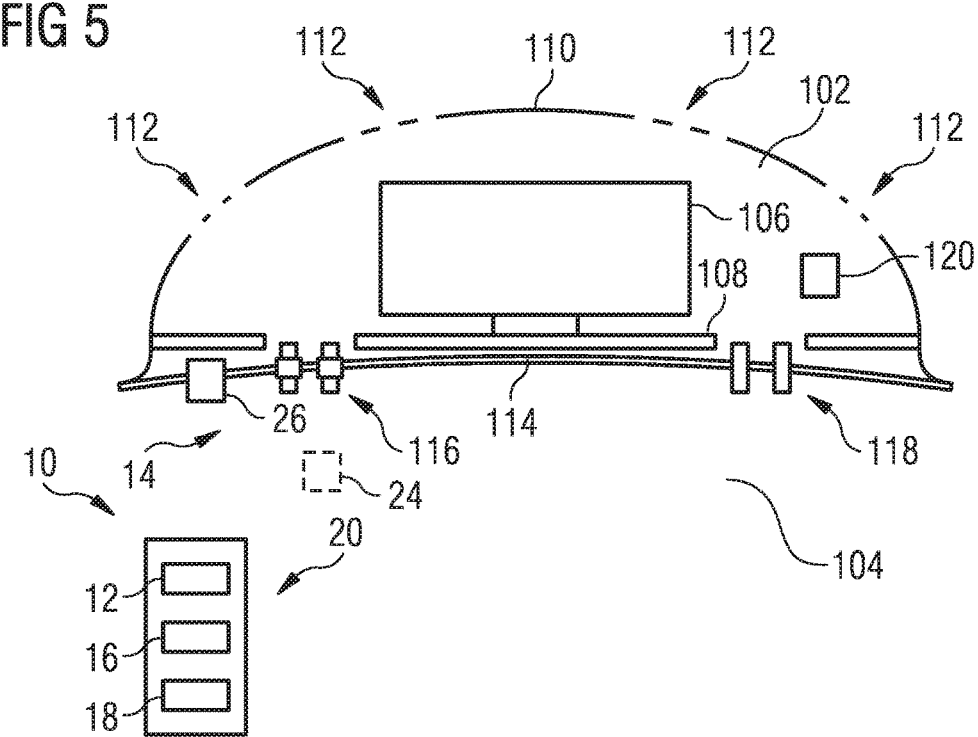
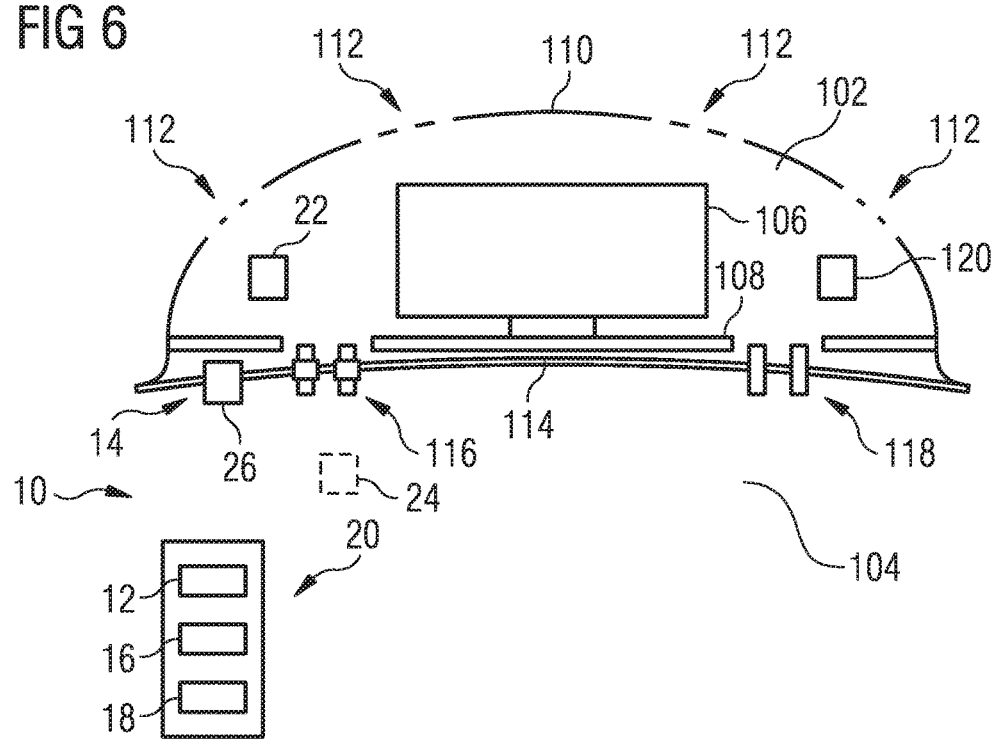

METHOD AND SYSTEM FOR DETECTING DAMAGE TO COMPONENTS OF AN AIRCRAFT

CROSS-REFERENCES TO RELATED APPLICATIONS

This application claims the benefit of the German patent application No. 10 2016 204 038.3 filed on Mar. 11, 2016, the entire disclosures of which are incorporated herein by way of reference.

BACKGROUND OF THE INVENTION

The invention relates to a method and a system for detecting damage to components of an aircraft.

In long-term operation of an aircraft, cracks occurring in structural members of the aircraft as a result of material fatigue, for example, and damage to components such as connecting elements, cable ducts or seals, for example, can lead to a decompression of a pressurized area of the aircraft. In particular, pressure equalization processes can take place between pressurized and unpressurized aircraft areas. For example, air from a passenger cabin, which is maintained at an increased pressure relative to the ambient pressure at the flight altitude of the aircraft when in flight mode of the aircraft, can flow into a radome or another unpressurized but outwardly closed area of the aircraft. Even if they do not result in any sudden and/or complete pressure equalization between a pressurized and an adjacent unpressurized aircraft area, pressure equalization processes of this kind increase the loads acting on the structural components in the unpressurized aircraft area. In consequence of this, these structural components must be designed to be suitably load-resistant. Furthermore, ventilation openings are provided as required to reduce excess pressures.

SUMMARY OF THE INVENTION

The invention addresses an object of specifying a method and a system that make it possible to detect, in a simple manner, damage to components of an aircraft that necessitates repair and can lead to undesirable compression processes in an unpressurized aircraft area.

In a method to detect damage to a component of an aircraft, which has an unpressurized first area and a pressurized second area, at least one theoretical pressure parameter is determined. "Unpressurized area" of an aircraft is understood to mean an area of the aircraft that is not maintained artificially, i.e., by an air conditioning system of the aircraft, for example, at a pressure deviating from the ambient pressure in the environment of the aircraft. In flight mode of the aircraft, a pressure therefore exists in the unpressurized area that is dependent on the flight altitude of the aircraft and substantially corresponds to the reduced ambient pressure in the environment of the aircraft compared with the atmospheric pressure at sea level. The unpressurized first area of the aircraft may be an unpressurized section of a cargo hold or of a belly fairing or a radome, for example. In contrast to this, the term "pressurized area" describes an area of the aircraft in which, in flight mode of the aircraft, an increased pressure can be set compared with the ambient pressure in the environment of the aircraft, for example by means of an air conditioning system of the aircraft. The pressurized second area of the aircraft may be a pressurized section of a cargo hold, for example, a pressurized component installation space, a passenger cabin, a cockpit or similar spaces.

The theoretical pressure parameter determined as part of the method for detecting damage to a component of an aircraft is characteristic of a theoretical pressure in the unpressurized first area, a theoretical pressure in the pressurized second area or a theoretical pressure difference between the unpressurized first area and the pressurized second area. The theoretical pressure parameter is preferably selected assuming a damage-free aircraft. This means that the theoretical pressure parameter is preferably characteristic of the theoretical pressure in the unpressurized first area, the theoretical pressure in the pressurized second area or the theoretical pressure difference between the unpressurized first area and the pressurized second area that exists when the components of the aircraft that can influence the pressure conditions in the unpressurized first area and/or the pressurized second area are in a perfect condition.

Furthermore, at least one actual pressure parameter is recorded, which is characteristic of an actual pressure in the unpressurized first area, an actual pressure in the pressurized second area or an actual pressure difference between the unpressurized first area and the pressurized second area. The actual pressure parameter is a measured variable that provides information about the actual pressure in the unpressurized first area or the pressurized second area or about the actual pressure difference between the unpressurized first area and the pressurized second area, and is influenced by damage to components of the aircraft that influences the pressure conditions in the unpressurized first area and/or the pressurized second area.

In the next step, the theoretical pressure parameter is compared with the actual pressure parameter. In this comparison, differences between the theoretical pressure parameter and the actual pressure parameter can be detected.

Damage to a component of the aircraft that causes a compression of the unpressurized first area, i.e., damage to a component of the aircraft that leads to air flowing inadvertently out of the pressurized second area into the unpressurized first area, is detected when a difference between the theoretical pressure parameter and the actual pressure parameter exceeds a threshold value. The threshold value selected is preferably so high that normal fluctuations in the pressure conditions in the unpressurized first area and/or the pressurized second area, which are caused, for example, by different operating or flight modes of the aircraft, operating variations of an air conditioning system of the aircraft or the like, are not taken into account. At the same time, however, the threshold value selected is preferably low enough that minor damage to components of the aircraft that influences the pressure conditions in the unpressurized first area and/or the pressurized second area is detected in good time.

Using the method according to the invention, damage to components of the aircraft, such as material fatigue cracks, for example, which damage influences the pressure conditions in the unpressurized first area and/or the pressurized second area and causes a compression of the unpressurized first area, can be detected at an early stage and repaired accordingly. Typical components for which the integrity can be monitored by the method according to the invention are a partition wall between the first unpressurized area and the second pressurized area, for example, as well as connecting elements, cable ducts or seals provided in the area of such a partition wall.

Due to the early detection of any damage, repair costs can be kept down and an increase in the damage prevented.

Moreover, components responsible for maintaining the desired pressure conditions in the unpressurized first area and/or the pressurized second area can be kept in a perfectly functioning state. Stresses on the structural components of the aircraft resulting from an undesirable compression of the unpressurized first area can consequently be reduced and these structural components dimensioned to be of lighter weight as a result.

In a preferred embodiment of the method, a first theoretical pressure parameter, which is characteristic of a theoretical pressure in the unpressurized first area or a theoretical pressure in the pressurized second area, and a second theoretical pressure parameter, which is characteristic of a theoretical pressure difference between the unpressurized first area and the pressurized second area, are determined. A first actual pressure parameter, which is characteristic of an actual pressure in the unpressurized first area or an actual pressure in the pressurized second area, and a second actual pressure parameter, which is characteristic of an actual pressure difference between the unpressurized first area and the pressurized second area, may also be recorded. The first theoretical pressure parameter may be compared with the first actual pressure parameter. The second theoretical pressure parameter may be compared, on the other hand, with the second actual pressure parameter. Damage to a component of the aircraft causing a compression of the unpressurized first area is preferably detected if a difference between the first theoretical pressure parameter and the first actual pressure parameter exceeds a first threshold value and/or a difference between the second theoretical pressure parameter and the second actual pressure parameter exceeds a second threshold value.

In this embodiment of the invention, an absolute pressure in the unpressurized first area or the pressurized second area and a pressure difference between the unpressurized first area and the pressurized second area are used in parallel to detect damage to a component of the aircraft causing a compression of the unpressurized first area. This redundancy results in increased method security. If desired, three parameters, i.e., an absolute pressure in the unpressurized first area, an absolute pressure in the pressurized second area and a pressure difference between the unpressurized first area and the pressurized second area may also be used in parallel through corresponding comparisons between theoretical and actually measured parameter values to detect damage to a component of the aircraft causing a compression of the unpressurized first area.

The theoretical pressure in the unpressurized first area is preferably determined on the basis of a measured flight altitude of the aircraft. The theoretical pressure in the pressurized second area is preferably determined, on the other hand, taking account of a measured flight altitude of the aircraft, on the basis of altitude-dependent reference values and/or on the basis of an operating state of an air conditioning system of the aircraft. The altitude of the aircraft may be determined by a separate aerial or a separate GPS system or retrieved by another measuring or control system of the aircraft. The method preferably operates using barometric height data. Other known influences, such as flight attitude, flow effects or temperature may be corrected mathematically if necessary.

The theoretical pressures in the unpressurized first area associated with the respective altitudes may be saved in a memory, for example in the form of a look-up table. Reference values for the theoretical pressure in the pressurized second area may also be saved in a memory for various flight altitudes. Such reference values may be altitude-dependent target cabin pressures, for example. In addition or alternatively to this, data characteristic of the operating state of an aircraft air conditioning system, which maintains the pressurized second area at an increased pressure compared with the ambient pressure in the environment of the aircraft in flight mode of the aircraft, may be used for determining the theoretical pressure in the pressurized second area.

The actual pressure in the unpressurized first area may be recorded by a first absolute pressure sensor arranged in the unpressurized first area. In a similar manner, the actual pressure in the pressurized second area may be recorded by a second absolute pressure sensor arranged in the pressurized second area. The actual pressure difference between the unpressurized first area and the pressurized second area is preferably recorded by a differential pressure sensor. This differential pressure sensor may be arranged in the region of a partition wall between the unpressurized first area and the pressurized second area, for example. Alternatively to this, however, it is also conceivable to calculate the actual pressure difference between the unpressurized first area and the pressurized second area from the measured values, which are recorded by a first absolute pressure sensor arranged in the unpressurized first area and a second absolute pressure sensor arranged in the pressurized second area.

The sensors used to record the actual pressure parameter may be sensors that are used exclusively to supply measuring data for carrying out the method according to the invention. Alternatively to this, however, it is also conceivable to use sensors that are used anyway in the aircraft, for example cabin pressure sensors, which provide data for controlling the aircraft air conditioning system, to supply measuring data for the method for detecting damage to a component of an aircraft.

The determination of at least one theoretical pressure parameter, which is characteristic of a theoretical pressure in the unpressurized first area, a theoretical pressure in the pressurized second area or a theoretical pressure difference between the unpressurized first area and the pressurized second area, preferably takes place taking at least one correction parameter determined as part of a calibration measurement into account. The use of at least one correction parameter is relevant, in particular, for determining the theoretical pressure in the unpressurized first area and consequently also for determining the theoretical pressure difference between the unpressurized first area and the pressurized second area, as the pressure in the unpressurized first area does not necessarily correspond exactly to the atmospheric pressure in the environment of the aircraft.

Flow effects, for example, which occur in the region of ventilation openings connecting the unpressurized first area to the environment of the aircraft, can be responsible for deviations in the pressure in the unpressurized first area from the atmospheric pressure in the environment of the aircraft. Deviations of this kind can be determined as part of a calibration measurement and compensated for by a suitable correction parameter. Different correction parameters are preferably used for different kinds of unpressurized first areas.

The at least one correction parameter may be a fixed correction value. Alternatively to this, however, the correction value may also be a correction function, which corrects the discrepancy between the theoretical ambient pressure prevailing at a measured flight altitude and the theoretical pressure in the unpressurized first area as a function of the measured flight altitude and/or as a function of measured air flow effects, which can influence the flow conditions in the region of ventilation openings connecting the unpressurized first area to the environment of the aircraft.

The measured values supplied by a sensor for measuring the absolute pressure in the unpressurized first area, or by a differential pressure sensor when executing the method for detecting damage to a component of an aircraft, can also be used to monitor the correct operation of the ventilation openings. For example, it can be determined with reference to the values measured by the absolute pressure sensor or the differential pressure sensor whether the difference between the theoretical ambient pressure prevailing at a measured flight altitude and the theoretical pressure in the unpressurized first area, which difference is expected on account of the prevailing air flow effects, actually exists or not. If the actual difference between the theoretical ambient pressure prevailing at a measured flight altitude and the theoretical pressure in the unpressurized first area differs from the expected deviation, this can be interpreted as an indication of a malfunction of the ventilation openings, for example a blockage of the ventilation openings due to ice or dirt.

A system for detecting damage to a component of an aircraft, which has an unpressurized first area and a pressurized second area, comprises a determination device for determining at least one theoretical pressure parameter, which is characteristic of a theoretical pressure in the unpressurized first area, a theoretical pressure in the pressurized second area or a theoretical pressure difference between the unpressurized first area and the pressurized second area. The system further comprises a recording device for recording at least one actual pressure parameter, which is characteristic of an actual pressure in the unpressurized first area, an actual pressure in the pressurized second area or an actual pressure difference between the unpressurized first area and the pressurized second area.

A comparison device of the system is configured to compare the theoretical pressure parameter with the actual pressure parameter. Finally, the system comprises a detection device for detecting damage to a component of the aircraft causing a compression of the unpressurized first area when a difference between the theoretical pressure parameter and the actual pressure parameter exceeds a threshold value. The determination device, the comparison device and the detection device can be executed as separate devices or integrated into a higher-level control facility as software and hardware components.

The determination device is preferably configured to determine a first theoretical pressure parameter, which is characteristic of a theoretical pressure in the unpressurized first area or a theoretical pressure in the pressurized second area, and a second theoretical pressure parameter, which is characteristic of a theoretical pressure difference between the unpressurized first area and the pressurized second area. The recording device is further preferably configured to record a first actual pressure parameter, which is characteristic of an actual pressure in the unpressurized first area or an actual pressure in the pressurized second area, and a second actual pressure parameter, which is characteristic of an actual pressure difference between the unpressurized first area and the pressurized second area.

The comparison device may then be configured to compare the first theoretical pressure parameter with the first actual pressure parameter and to compare the second theoretical pressure parameter with the second actual pressure parameter. The detection device may further be configured to detect damage to a component of the aircraft causing a compression of the unpressurized first area when a difference between the first theoretical pressure parameter and the first actual pressure parameter exceeds a first threshold value and/or a difference between the second theoretical pressure parameter and the second actual pressure parameter exceeds a second threshold value.

The determination device is preferably configured to determine the theoretical pressure in the unpressurized first area on the basis of a measured flight altitude of the aircraft. Alternatively or in addition to this, the determination device may be configured to determine the theoretical pressure in the pressurized second area, taking account of a measured flight altitude of the aircraft, on the basis of altitude-dependent reference values and/or on the basis of an operating state of an air conditioning system of the aircraft.

The recording device may comprise a first absolute pressure sensor arranged in the unpressurized first area for recording the actual pressure in the unpressurized first area and/or a second absolute pressure sensor arranged in the pressurized second area for recording the actual pressure in the pressurized second area. In addition or alternatively to this, the recording device may be equipped with a differential pressure sensor for recording the actual pressure difference between the unpressurized first area and the pressurized second area. The differential pressure sensor may be arranged, for example, in the region of a partition wall between the unpressurized first area and the pressurized second area.

The determination device may be configured to determine at least one theoretical pressure parameter, which is characteristic of a theoretical pressure in the unpressurized first area, a theoretical pressure in the pressurized second area or a theoretical pressure difference between the unpressurized first area and the pressurized second area, taking at least one correction parameter determined as part of a calibration measurement into account.

The at least one correction parameter may correct a discrepancy between the theoretical ambient pressure prevailing at a measured flight altitude and the theoretical pressure in the unpressurized first area.

The at least one correction parameter may be a fixed correction value or a correction function, which corrects the discrepancy between the theoretical ambient pressure prevailing at a measured flight altitude and the theoretical pressure in the unpressurized first area as a function of the measured flight altitude and/or as a function of measured air flow effects.

An aircraft according to the invention, which has an unpressurized first area and a pressurized second area, is equipped with a system described above for detecting damage to a component of an aircraft. The unpressurized first area is preferably a radome, i.e., an area of the aircraft in which an aerial is arranged.

BRIEF DESCRIPTION OF THE DRAWINGS

Preferred embodiments of the invention are now explained with reference to the enclosed schematic drawings, of which FIG. 1 shows a first embodiment of a system for detecting damage to a component of an aircraft, FIG. 2 shows a second embodiment of a system for detecting damage to a component of an aircraft, FIG. 3 shows a third embodiment of a system for detecting damage to a component of an aircraft, FIG. 4 shows a fourth embodiment of a system for detecting damage to a component of an aircraft, FIG. 5 shows a fifth embodiment of a system for detecting damage to a component of an aircraft and FIG. 6 shows a sixth embodiment of a system for detecting damage to a component of an aircraft.

DETAILED DESCRIPTION OF THE PREFERRED EMBODIMENTS

FIG. 1 shows a partial section of an aircraft, which has an unpressurized first area 102 and a pressurized second area 104. In flight mode of the aircraft, a pressure occurs in the unpressurized first area 102 that is dependent on the flight altitude of the aircraft and substantially corresponds to the reduced ambient pressure in the environment of the aircraft compared with the atmospheric pressure at sea level. In the arrangement shown in the figures, the unpressurized first area 102 is formed in the shape of a radome, in which an aerial 106 is arranged. The aerial 106 is attached to an adapter plate 108. The unpressurized first area 102 formed in the shape of a radome is separated from the environment of the aircraft by an outer skin 110. A plurality of ventilation openings 112 are formed in the outer skin 110, which are used to remove any excess pressures in the unpressurized first area 102.

The unpressurized first area 102 is separated from the pressurized second area 104 by a partition wall 114. Connecting elements 116 and cable ducts 118 are carried through the partition wall 114 in a sealing manner. The pressurized second area 104, which is in the form of a passenger cabin in the arrangement shown in the figures, is maintained in flight mode of the aircraft at an increased pressure compared with the ambient pressure in the environment of the aircraft by an air conditioning system, which is not illustrated in greater detail.

In long-term operation of an aircraft, cracks or other damage can occur in the partition wall 114, the connecting elements 116, the cable ducts 118 and/or in seals provided in the region of the partition wall 114 that can lead to a decompression of the pressurized second aircraft area 104, i.e., an escape of air from the pressurized second area 104 into the unpressurized first area 102 and thus to a compression of the unpressurized first area 102. To be able to detect and repair this damage at an early stage, a system 10 is provided for detecting damage to a component of the aircraft.

The system 10 comprises a determination device 12 for determining at least one theoretical pressure parameter, which is characteristic of a theoretical pressure ptheo1 in the unpressurized first area 102, a theoretical pressure ptheo2 in the pressurized second area 104 or a theoretical pressure difference $\Delta p_{theo}$ between the unpressurized first area 102 and the pressurized second area 104. The system 10 further comprises a recording device 14 for recording at least one actual pressure parameter, which is characteristic of an actual pressure pactual1 in the unpressurized first area 102, an actual pressure pactual2 in the pressurized second area 104 or an actual pressure difference $\Delta p_{actual}$ between the unpressurized first area 102 and the pressurized second area 104.

A comparison device 16 of the system 10 is configured to compare the theoretical pressure parameter with the actual pressure parameter. Finally, the system 10 comprises a detection device 18 for detecting damage to a component of the aircraft, for example the partition wall 114, a connecting element 116, a cable duct 118 or a seal provided in the region of the partition wall 114, which damage causes a compression of the unpressurized first area 102, when a difference between the theoretical pressure parameter and the actual pressure parameter exceeds a threshold value. In the arrangement shown in the figures, the determination device 12, the comparison device 16 and the detection device 18 are integrated into a control device 20, but can also be executed as separate devices.

In the first embodiment of the system 10 shown in FIG. 1, the recording device 14 comprises a first absolute pressure sensor 22 arranged in the unpressurized first area 102, which sensor measures the actual pressure pactual1 in the unpressurized first area 102. The measured value recorded by the first absolute pressure sensor 22 and characteristic of the actual pressure pactual1 in the unpressurized first area 102 is transmitted to the comparison device 16 as actual pressure parameter. The comparison device 16 also receives from the determination device 12 as a theoretical pressure parameter the theoretical pressure ptheo1 in the unpressurized first area 102, which is determined by the determination device 12 on the basis of a measured flight altitude of the aircraft. The altitude of the aircraft is measured by a GPS system 120, which is provided anyway in the unpressurized first area 102 in the form of a radome.

The comparison device 16 compares the theoretical pressure parameter transmitted to it by the determination device 12, which parameter is characteristic of the theoretical pressure ptheo1 in the unpressurized first area 102, with the actual pressure parameter transmitted to it by the recording device 14 and characteristic of the actual pressure pactual1 in the unpressurized first area 102. If the actual pressure pactual1 in the unpressurized first area 102 exceeds the theoretical pressure ptheo1 in the unpressurized first area 102, this indicates that air from the pressurized second area 104 is escaping into the unpressurized first area 102 and causing a pressure increase there. However, more minor pressure variations in the unpressurized first area 102 should not be taken into account. On the basis of the pressure value comparison carried out by the comparison device 16, the detection device 18 therefore only detects damage to a component of the aircraft causing a compression of the unpressurized first area 102 when the difference between the theoretical pressure parameter characteristic of the theoretical pressure ptheo1 in the unpressurized first area 102 and the actual pressure parameter characteristic of the actual pressure pactual1 in the unpressurized first area 102 exceeds a threshold value.

The second embodiment of the system 10 illustrated in FIG. 2 differs from the arrangement shown in FIG. 1 in that, instead of a first absolute pressure sensor arranged in the unpressurized first area 102, the recording device 14 comprises a second absolute pressure sensor 24, which is arranged in the pressurized second area 104 and measures the actual pressure pactual2 in the pressurized second area 104. The measured value recorded by the second absolute pressure sensor 24 and characteristic of the actual pressure pactual2 in the pressurized second area 104 is transmitted as an actual pressure parameter to the comparison device 16. The comparison device 16 further receives from the determination device 12 as a theoretical pressure parameter the theoretical pressure ptheo2 in the pressurized second area 104, which is determined by the determination device 12, taking account of the flight altitude of the aircraft measured by the GPS system 120, on the basis of altitude-dependent reference values for the pressure in the pressurized second area 104 in the form of a passenger cabin. In addition or alternatively to this, the determination device 12 can also refer to operating state data of the air conditioning system of the aircraft responsible for creating the pressure in the pressurized second area 104 when determining the theoretical pressure ptheo2 in the pressurized second area 104.

The comparison device 16 compares the theoretical pressure parameter transmitted to it by the determination device 12, which parameter is characteristic of the theoretical pressure $p_{theo2}$ in the pressurized second area 104, with the actual pressure parameter transmitted to it by the recording device 14 and characteristic of the actual pressure $p_{actual2}$ in the pressurized second area 104. If the actual pressure $p_{actual2}$ in the pressurized second area 104 falls below the theoretical pressure $p_{theo2}$ in the pressurized second area 104, this indicates that air from the pressurized second area 104 is escaping into the unpressurized first area 102, leading to a pressure drop in the pressurized second area 104. However, more minor pressure variations in the pressurized second area 104 should not be taken into account. On the basis of the pressure value comparison carried out by the comparison device 16, the detection device 18 therefore only detects damage to a component of the aircraft causing a compression of the unpressurized first area 102 when the difference between the theoretical pressure parameter characteristic of the theoretical pressure $p_{theo2}$ in the pressurized second area 104 and the actual pressure parameter characteristic of the actual pressure $p_{actual2}$ in the pressurized second area 104 exceeds a threshold value.

The third embodiment of the system 10 illustrated in FIG. 3 differs from the arrangement shown in FIG. 1 in that, instead of a first absolute pressure sensor arranged in the unpressurized first area 102, the recording device 14 comprises a differential pressure sensor 26. The differential pressure sensor 26 is arranged in the region of the partition wall 114 provided between the unpressurized first area 102 and the pressurized second area 104 and measures the actual pressure difference $\Delta p_{actual}$ between the unpressurized first area 102 and the pressurized second area 104. The measured value recorded by the differential pressure sensor 26 and characteristic of the actual pressure difference $\Delta p_{actual}$ between the unpressurized first area 102 and the pressurized second area 104 is transmitted as an actual pressure parameter to the comparison device 16. The comparison device 16 further receives from the determination device 12 as a theoretical pressure parameter the theoretical pressure difference $\Delta p_{theo}$ between the unpressurized first area 102 and the pressurized second area 104. The theoretical pressure difference $\Delta p_{theo}$ is calculated by the determination device 12 by forming the difference from the theoretical pressure ptheo1 in the unpressurized first area 102 and the theoretical pressure $\Delta p_{theo2}$ in the pressurized second area 104, which are determined by the determination device 12 as described above with reference to FIGS. 1 and 2.

The comparison device 16 compares the theoretical pressure parameter transmitted to it by the determination device 12, which parameter is characteristic of the theoretical pressure difference $\Delta p_{theo}$ between the unpressurized first area 102 and the pressurized second area 104, with the actual pressure parameter transmitted to it by the recording device 14 and characteristic of the actual pressure difference $\Delta p_{actual}$ between the unpressurized first area 102 and the pressurized second area 104. If the actual pressure difference $\Delta p_{actual}$ between the unpressurized first area 102 and the pressurized second area 104 falls below the theoretical pressure difference $\Delta p_{theo}$ between the unpressurized first area 102 and the pressurized second area 104, this indicates that air from the pressurized second area 104 is escaping into the unpressurized first area 102, leading to a reduction in the pressure difference between the unpressurized first area 102 and the pressurized second area 104. However, more minor pressure variations in the unpressurized first area 102 and/or the pressurized second area 104 should not be taken into account. On the basis of the pressure difference value comparison carried out by the comparison device 16, the detection device 18 therefore only detects damage to a component of the aircraft causing a compression of the unpressurized first area 102 when the difference between the theoretical pressure parameter characteristic of the theoretical pressure difference $\Delta p_{theo}$ between the unpressurized first area 102 and the pressurized second area 104 and the actual pressure parameter characteristic of the actual pressure difference $\Delta p_{actual}$ between the unpressurized first area 102 and the pressurized second area 104 exceeds a threshold value.

The fourth embodiment of the system 10 illustrated in FIG. 4 differs from the arrangement shown in FIG. 1 in that, as well as a first absolute pressure sensor 22 described above in connection with FIG. 1, the recording device 14 comprises a differential pressure sensor 26 described above in connection with FIG. 3. The recording device 14 thus records (by means of the first absolute pressure sensor 22) a first actual pressure parameter characteristic of the actual pressure pactual1 in the unpressurized first area 102 and (by means of the differential pressure sensor 26) a second actual pressure parameter characteristic of the actual pressure difference $\Delta p_{actual}$ between the unpressurized first area 102 and the pressurized second area 104.

In the arrangement according to FIG. 4, the comparison device 16 therefore receives a first theoretical pressure parameter from the determination device 12, which parameter is determined as described above in connection with FIG. 1 and is characteristic of the theoretical pressure $p_{theo1}$ in the unpressurized first area 102. The comparison device 16 further receives from the determination device 12 a second theoretical pressure parameter, which is determined as described above in connection with FIG. 3 and is characteristic of the theoretical pressure difference $\Delta p_{theo}$ between the unpressurized first area 102 and the pressurized second area 104. The comparison device 16 compares the first theoretical pressure parameter characteristic of the theoretical pressure $p_{theo1}$ in the unpressurized first area 102 with the first actual pressure parameter transmitted to it by the recording device 14 and characteristic of the actual pressure pactual1 in the unpressurized first area 102. The comparison device 16 further compares the second theoretical pressure parameter characteristic of the theoretical pressure difference $\Delta p_{theo}$ between the unpressurized first area 102 and the pressurized second area 104 with the second actual pressure parameter transmitted to it by the recording device 14 and characteristic of the actual pressure difference $\Delta p_{actual}$ between the unpressurized first area 102 and the pressurized second area 104.

On the basis of the pressure value and pressure difference value comparison carried out by the comparison device 16, the detection device 18 detects damage to a component of the aircraft causing a compression of the unpressurized first area 102 when the difference between the first theoretical pressure parameter characteristic of the theoretical pressure ptheo1 in the unpressurized first area 102 and the first actual pressure parameter characteristic of the actual pressure pactual1 in the unpressurized first area 102 exceeds a first threshold value and/or the difference between the theoretical pressure parameter characteristic of the theoretical pressure difference $\Delta p_{theo}$ between the unpressurized first area 102 and the pressurized second area 104 and the actual pressure parameter characteristic of the actual pressure difference $\Delta p_{actual}$ between the unpressurized first area 102 and the pressurized second area 104 exceeds a second threshold value.

The fifth embodiment of the system 10 illustrated in FIG. 5 differs from the arrangement shown in FIG. 4 in that, instead of a first absolute pressure sensor 22, the recording device 14 comprises a second absolute pressure sensor 24 described above in connection with FIG. 2. The recording device 14 thus records (by means of the second absolute pressure sensor 24) a first actual pressure parameter characteristic of the actual pressure pactual2 in the pressurized second area 104 and (by means of the differential pressure sensor 26) a second actual pressure parameter characteristic of the actual pressure difference $\Delta p_{actual}$ between the unpressurized first area 102 and the pressurized second area 104.

The comparison device 16 therefore receives a first theoretical pressure parameter from the determination device 12, which parameter is determined as described above in connection with FIG. 2 and is characteristic of the theoretical pressure $p_{theo2}$ in the pressurized second area 104. The comparison device 16 further receives from the determination device 12 a second theoretical pressure parameter, which is determined as described above in connection with FIG. 3 and is characteristic of the theoretical pressure difference $\Delta p_{theo}$ between the unpressurized first area 102 and the pressurized second area 104. The comparison device 16 compares the first theoretical pressure parameter characteristic of the theoretical pressure $p_{theo2}$ in the pressurized second area 104 with the first actual pressure parameter transmitted to it by the recording device 14 and characteristic of the actual pressure $p_{actual2}$ in the pressurized second area 104. The comparison device 16 further compares the second theoretical pressure parameter characteristic of the theoretical pressure difference $\Delta p_{theo}$ between the unpressurized first area 102 and the pressurized second area 104 with the second actual pressure parameter transmitted to it by the recording device 14 and characteristic of the actual pressure difference $\Delta p_{actual}$ between the unpressurized first area 102 and the pressurized second area 104.

On the basis of the pressure value and pressure difference value comparison carried out by the comparison device 16, the detection device 18 detects damage to a component of the aircraft causing a compression of the unpressurized first area 102 when the difference between the first theoretical pressure parameter characteristic of the theoretical pressure $p_{theo2}$ in the pressurized second area 104 and the first actual pressure parameter characteristic of the actual pressure $p_{actual2}$ in the pressurized second area 104 exceeds a first threshold value and/or the difference between the theoretical pressure parameter characteristic of the theoretical pressure difference $\Delta p_{theo}$ between the unpressurized first area 102 and the pressurized second area 104 and the actual pressure parameter characteristic of the actual pressure difference $\Delta p_{actual}$ between the unpressurized first area 102 and the pressurized second area 104 exceeds a second threshold value.

Finally, the sixth embodiment of the system 10 illustrated in FIG. 6 differs from the arrangement shown in FIG. 4 in that, in addition to a first absolute pressure sensor 22 and a differential pressure sensor 26, the recording device 14 comprises a second absolute pressure sensor 24. The recording device 14 thus records (by means of the first absolute pressure sensor 22) a first actual pressure parameter characteristic of the actual pressure pactual1 in the unpressurized first area 102, (by means of the second absolute pressure sensor 24) another first actual pressure parameter characteristic of the actual pressure $p_{actual2}$ in the pressurized second area 104 and (by means of the differential pressure sensor 26) a second actual pressure parameter characteristic of the actual pressure difference $\Delta p_{actual}$ between the unpressurized first area 102 and the pressurized second area 104.

The comparison device 16 therefore receives a first theoretical pressure parameter from the determination device 12, which parameter is characteristic of the theoretical pressure $p_{theo1}$ in the unpressurized first area 102 and another first theoretical pressure parameter characteristic of the theoretical pressure $p_{theo2}$ in the pressurized second area 104. The comparison device 16 further receives from the determination device 12 a second theoretical pressure parameter, which is characteristic of the theoretical pressure difference $\Delta p_{theo}$ between the unpressurized first area 102 and the pressurized second area 104.

The comparison device 16 compares the first theoretical pressure parameter characteristic of the theoretical pressure ptheo1 in the unpressurized first area 102 with the first actual pressure parameter transmitted to it by the recording device 14 and characteristic of the actual pressure pactual1 in the unpressurized first area 102. The comparison device 16 further compares the other first theoretical pressure parameter characteristic of the theoretical pressure $p_{theo2}$ in the pressurized second area 104 with the other first actual pressure parameter transmitted to it by the recording device 14 and characteristic of the actual pressure $p_{actual2}$ in the pressurized second area 104. Finally, the comparison device 16 compares the second theoretical pressure parameter characteristic of the theoretical pressure difference $\Delta p_{theo}$ between the unpressurized first area 102 and the pressurized second area 104 with the second actual pressure parameter transmitted to it by the recording device 14 and characteristic of the actual pressure difference $\Delta p_{actual}$ between the unpressurized first area 102 and the pressurized second area 104.

On the basis of the pressure value and pressure difference value comparison carried out by the comparison device 16, the detection device 18 detects damage to a component of the aircraft causing a compression of the unpressurized first area 102 when the difference between the first theoretical pressure parameter characteristic of the theoretical pressure ptheo1 in the unpressurized first area 102 and the first actual pressure parameter characteristic of the actual pressure $p_{actual1}$ in the unpressurized first area 102 exceeds a first threshold value, when the difference between the other first theoretical pressure parameter characteristic of the theoretical pressure $p_{theo2}$ in the pressurized second area 104 and the other first actual pressure parameter characteristic of the actual pressure pactual2 in the pressurized second area 104 exceeds another first threshold value and/or the difference between the theoretical pressure parameter characteristic of the theoretical pressure difference $\Delta p_{theo}$ between the unpressurized first area 102 and the pressurized second area 104 and the actual pressure parameter characteristic of the actual pressure difference $\Delta p_{actual}$ between the unpressurized first area 102 and the pressurized second area 104 exceeds a second threshold value.

The determination device 12 determines at least one theoretical pressure parameter, which is characteristic of a $p_{theo1}$ in the unpressurized first area 102, a theoretical pressure $p_{theo2}$ in the pressurized second area 104 or a theoretical pressure difference $\Delta p_{theo}$ between the unpressurized first area 102 and the pressurized second area 104, taking account of at least one correction parameter determined as part of a calibration measurement. By using a correction parameter, flow effects, for example, which occur in the region of the ventilation openings 112 provided in the outer skin 110 of the unpressurized first area 102 and are responsible for differences in the pressure in the unpressurized first area 102 from the atmospheric pressure in the environment of the aircraft, can be taken into account and compensated for. The correction parameter can be a fixed correction value. Alternatively to this, however, the correction value can also be a correction function, which corrects the discrepancy between the theoretical ambient pressure prevailing at a measured flight altitude and the theoretical pressure ptheo1 in the unpressurized first area 102 as a function of the measured flight altitude and/or as a function of measured air flow effects, which can influence the flow conditions in the region of the ventilation openings 112.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for detecting damage to a component of an aircraft, which has an unpressurized first area and a pressurized second area, wherein the method comprises the steps:
   determining at least one theoretical pressure parameter, which is characteristic of one of
      a theoretical pressure in the unpressurized first area,
      a theoretical pressure in the pressurized second area, or
      a theoretical pressure difference between the unpressurized first area and the pressurized second area,
   recording at least one actual pressure parameter, which is characteristic of one of
      an actual pressure in the unpressurized first area,
      an actual pressure in the pressurized second area, or
      an actual pressure difference between the unpressurized first area and the pressurized second area,
   comparing the theoretical pressure parameter with the actual pressure parameter, and
   detecting a damage to a component of the aircraft causing a compression of the unpressurized first area when a difference between the theoretical pressure parameter and the actual pressure parameter exceeds a threshold value.

2. The method according to claim 1, further comprising the steps:
   determining a first theoretical pressure parameter, which is characteristic of one of a theoretical pressure in the unpressurized first area or a theoretical pressure in the pressurized second area,
   determining a second theoretical pressure parameter, which is characteristic of a theoretical pressure difference between the unpressurized first area and the pressurized second area,
   recording a first actual pressure parameter, which is characteristic of one of an actual pressure in the unpressurized first area or an actual pressure in the pressurized second area,
   recording a second actual pressure parameter, which is characteristic of an actual pressure difference between the unpressurized first area and the pressurized second area,
   comparing the first theoretical pressure parameter with the first actual pressure parameter,
   comparing the second theoretical pressure parameter with the second actual pressure parameter, and
   detecting damage to a component of the aircraft causing a compression of the unpressurized first area when at least one of
      a difference between the first theoretical pressure parameter and the first actual pressure parameter exceeds a first threshold value, or
      a difference between the second theoretical pressure parameter and the second actual pressure parameter exceeds a second threshold value.

3. The method according to claim 1, further comprising at least one of the steps of:
   determining the theoretical pressure in the unpressurized first area on the basis of a measured flight altitude of the aircraft, or
   determining the theoretical pressure in the pressurized second area, by taking a measured flight altitude of the aircraft into account, on the basis of at least one of altitude-dependent reference values or an operating state of an air conditioning system of the aircraft.

4. The method according to claim 1, further including at least one of the steps of:
   recording the actual pressure in the unpressurized first area by a first absolute pressure sensor arranged in the unpressurized first area,
   recording the actual pressure in the pressurized second area by a second absolute pressure sensor arranged in the pressurized second area, or
   recording the actual pressure difference between the unpressurized first area and the pressurized second area by a differential pressure sensor, which is arranged in a region of a partition wall between the unpressurized first area and the pressurized second area.

5. The method according to claim 1, wherein the determination of at least one of
   the theoretical pressure parameter, which is characteristic of a theoretical pressure in the unpressurized first area,
   the theoretical pressure in the pressurized second area, or
   the theoretical pressure difference between the unpressurized first area and the pressurized second area,
takes place taking at least one correction parameter determined as part of a calibration measurement into account.

6. The method according to claim 5, wherein the at least one correction parameter corrects a discrepancy between the theoretical ambient pressure prevailing at a measured flight altitude and the theoretical pressure in the unpressurized first area.

7. The method according to claim 6, wherein the at least one correction parameter is a fixed correction value or a correction function, which corrects the discrepancy between the theoretical ambient pressure prevailing at a measured flight altitude and the theoretical pressure in the unpressurized first area as a function of at least one of the measured flight altitude or measured air flow effects.

8. A system for detecting damage to a component of an aircraft, which has an unpressurized first area and a pressurized second area, wherein the system comprises:
   a determination device configured to determine at least one theoretical pressure parameter, which is characteristic of one of a theoretical pressure in the unpressurized first area, a theoretical pressure in the pressurized second area, or a theoretical pressure difference between the unpressurized first area and the pressurized second area, a recording device configured to record at least one actual pressure parameter, which is characteristic of one of an actual pressure in the unpressurized first area, an actual pressure in the pressurized second area or an actual pressure difference between the unpressurized first area and the pressurized second area, a comparison device configured to compare the theoretical pressure parameter with the actual pressure parameter, and a detection device configured to detect damage to a component of the aircraft causing a compression of the unpressurized first area when a difference between the theoretical pressure parameter and the actual pressure parameter exceeds a threshold value.

9. The system according to claim 8, wherein:

the determination device is configured to determine the first theoretical pressure parameter, which is characteristic of one of the theoretical pressure in the unpressurized first area or the theoretical pressure in the pressurized second area, and a second theoretical pressure parameter, which is characteristic of the theoretical pressure difference between the unpressurized first area and the pressurized second area, the recording device is configured to record the first actual pressure parameter, which is characteristic of one of the actual pressure in the unpressurized first area or the actual pressure in the pressurized second area, and the second actual pressure parameter, which is characteristic of an actual pressure difference between the unpressurized first area and the pressurized second area, the comparison device is configured to compare the first theoretical pressure parameter with the first actual pressure parameter and the second theoretical pressure parameter with the second actual pressure parameter, and the detection device is configured to detect damage to a component of the aircraft causing a compression of the unpressurized first area when at least one of a difference between the first theoretical pressure parameter and the first actual pressure parameter exceeds a first threshold value or a difference between the second theoretical pressure parameter and the second actual pressure parameter exceeds a second threshold value.

10. The system according to claim 8, wherein at least one of:

the determination device is configured to determine the theoretical pressure in the unpressurized first area on the basis of a measured flight altitude of the aircraft, or the determination device is configured to determine the theoretical pressure in the pressurized second area, taking a measured flight altitude of the aircraft into account, on the basis of at least one of altitude-dependent reference values or an operating state of an air conditioning system of the aircraft.

11. The system according to claim 8, wherein the recording device comprises at least one of:

a first absolute pressure sensor arranged in the unpressurized first area for recording the actual pressure in the unpressurized first area, a second absolute pressure sensor for recording the actual pressure in the pressurized second area, or a differential pressure sensor for recording the actual pressure difference between the unpressurized first area and the pressurized second area, which sensor is arranged in a region of a partition wall between the unpressurized first area and the pressurized second area.

12. The system according to claim 8, wherein the determination device is configured to determine at least one theoretical pressure parameter, which is characteristic of one of a theoretical pressure in the unpressurized first area,
a theoretical pressure in the pressurized second area, or
a theoretical pressure difference between the unpressurized first area and the pressurized second area, taking account of at least one correction parameter determined as part of a calibration measurement.

13. The system according to claim 12, wherein the at least one correction parameter corrects a discrepancy between the theoretical ambient pressure prevailing at a measured flight altitude and the theoretical pressure in the unpressurized first area.

14. The system according to claim 13, wherein the at least one correction parameter is a fixed correction value or a correction function, which corrects the discrepancy between the theoretical ambient pressure prevailing at a measured flight altitude and the theoretical pressure in the unpressurized first area as a function of at least one of the measured flight altitude or measured air flow effects.

15. An aircraft, which has an unpressurized first area and a pressurized second area, and is equipped with a system according to claim 8, wherein the unpressurized first area is a radome.

* * * * *